United States Patent
Kim et al.

(10) Patent No.: US 10,796,496 B2
(45) Date of Patent: Oct. 6, 2020

(54) METHOD OF RECONSTRUCING 3D COLOR MESH AND APPARATUS FOR SAME

(71) Applicant: ELECTRONICS AND TELECOMMUNICATIONS RESEARCH INSTITUTE, Daejeon (KR)

(72) Inventors: Hye Sun Kim, Daejeon (KR); Kyung Kyu Kang, Daejeon (KR); Chang Joon Park, Daejeon (KR); Yun Ji Ban, Daejeon (KR); Dong Wan Ryoo, Daejeon (KR); Jung Jae Yu, Daejeon (KR); Man Hee Lee, Daejeon (KR); Chang Woo Chu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/057,664

(22) Filed: Aug. 7, 2018

(65) Prior Publication Data

US 2019/0164351 A1 May 30, 2019

(30) Foreign Application Priority Data

Nov. 24, 2017 (KR) .......................... 10-2017-0158234

(51) Int. Cl.
*G06T 19/00* (2011.01)
*G06T 19/20* (2011.01)
(Continued)

(52) U.S. Cl.
CPC .............. *G06T 19/20* (2013.01); *G06T 15/04* (2013.01); *G06T 17/205* (2013.01); *G06T 2200/08* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 6,750,873 B1 * | 6/2004 | Bernardini | G06T 15/04 345/581 |
| 2005/0062737 A1 * | 3/2005 | Wang | G06T 15/205 345/419 |

(Continued)

FOREIGN PATENT DOCUMENTS

| | | |
|---|---|---|
| JP | 6097903 B2 | 3/2017 |
| KR | 20080071377 A | 8/2008 |

(Continued)

OTHER PUBLICATIONS

Fausto Bernardini, "High-Quality Texture Reconstruction from Multiple Scans", pp. 1-14, IBM T. J. Watson Research Center.

*Primary Examiner* — Martin Mushambo

(57) ABSTRACT

Disclosed is a method of reconstructing a three-dimensional color mesh and an apparatus for the same. According to an embodiment of the present disclosure, the method includes: receiving mesh information of an object, multiple multi-view images obtained by photographing the object at different positions, and camera parameter information corresponding to the multiple multi-view images; constructing a texture map with respect to the object on the basis of the received information and setting a texture patch referring to a color value of the same multi-view image; correcting a color value of a vertex included for each texture patch; and performing rendering with respect to the object by applying the corrected color value of the vertex to the texture map.

14 Claims, 13 Drawing Sheets

(51) Int. Cl.
     *G06T 17/20*          (2006.01)
     *G06T 15/04*          (2011.01)

(56) References Cited

U.S. PATENT DOCUMENTS

| | | | | |
|---|---|---|---|---|
| 2007/0058858 A1* | 3/2007 | Harville | ............... | A45D 44/005 |
| | | | | 382/165 |
| 2007/0058860 A1* | 3/2007 | Harville | ............. | G06K 9/00234 |
| | | | | 382/167 |
| 2007/0071314 A1* | 3/2007 | Bhatti | ................. | G06K 9/6212 |
| | | | | 382/162 |
| 2010/0033484 A1* | 2/2010 | Kim | ..................... | G06T 19/006 |
| | | | | 345/426 |
| 2010/0158354 A1* | 6/2010 | Kim | ....................... | G06T 13/40 |
| | | | | 382/154 |
| 2010/0259541 A1* | 10/2010 | Kitago | ................... | G06T 17/20 |
| | | | | 345/423 |
| 2012/0162218 A1* | 6/2012 | Kim | ....................... | G06T 13/40 |
| | | | | 345/419 |
| 2014/0043329 A1* | 2/2014 | Wang | ..................... | G06T 17/20 |
| | | | | 345/420 |
| 2016/0104458 A1* | 4/2016 | Kim | ..................... | G06T 15/005 |
| | | | | 345/423 |
| 2016/0366391 A1* | 12/2016 | Lim | ...................... | G01B 11/22 |
| 2016/0366396 A1 | 12/2016 | Kim et al. | | |
| 2017/0061036 A1* | 3/2017 | Schmidt | ................. | G06F 17/50 |

FOREIGN PATENT DOCUMENTS

| | | |
|---|---|---|
| KR | 1020120071276 A | 7/2012 |
| KR | 1020170020210 A | 2/2017 |
| WO | 2015127246 A1 | 8/2015 |

\* cited by examiner

410

420

430

601

602

METHOD OF RECONSTRUCING 3D COLOR MESH AND APPARATUS FOR SAME

CROSS REFERENCE TO RELATED APPLICATION

The present application claims priority to Korean Patent Application No. 10-2017-0158234, filed Nov. 24, 2017, the entire contents of which is incorporated herein for all purposes by this reference.

BACKGROUND OF THE INVENTION

Field of the Invention

The present disclosure relates generally to a three-dimensional modeling technology. More particularly, the present disclosure relates to a method and apparatus for correcting a vertex value of a three-dimensional color mesh.

Description of the Related Art

Conventional technologies of capturing an outer shape of a subject are schematically classified into two methods. First, there is a method of scanning appearance information of a subject using an active sensor with, for example, laser or pattern light and extracting a texture of a scanned mesh from a color image of the subject. The method is generally used to generate a high-quality model only for a static subject.

Second, there is a method of reconstructing appearance information and surface color information of a subject from image information obtained by photographing a subject at different views using a passive camera. The method is separated into: a stereo type for reconstructing three-dimensional position information on the basis of triangulation using corresponding points in a stereo image; and a volumetric type for defining a voxel space composed of voxels in a three-dimensional space in advance and for determining whether a voxel is present on the basis of color correspondence between projection regions for reconstruction when projecting each voxel onto each image.

In the results of recent studies, three-dimensional reconstruction is performed on the basis of a multi-view image for a three-dimensional reconstruction result with high quality, and it takes too long for calculation in reconstruction of a static subject, however, the quality of the results is close to reconstruction quality of a laser scanner.

The foregoing is intended merely to aid in the understanding of the background of the present disclosure, and is not intended to mean that the present disclosure falls within the purview of the related art that is already known to those skilled in the art.

SUMMARY OF THE INVENTION

A method of performing three-dimensional reconstruction based on multi-view images is configured to map color information of a multi-view image corresponding to a three-dimensional mesh, thereby reconstructing three-dimensional information. The method may significantly enhance realism of the result by mapping a color value of an actual image to insufficient mesh information.

However, due to a difference in photographing environments between multi-view images used in three-dimensional reconstruction, brightness or color difference between the multi-view images used in dimension reconstruction may occur. Due to brightness or color difference between multi-view images, a color value difference, texture seam phenomenon, between textures referring thereto may occur.

Accordingly, the present disclosure has been made keeping in mind the above problems, and the present disclosure is intended to propose a method and apparatus for generating a three-dimensional image without a texture seam.

Also, the present disclosure is intended to propose a method and apparatus for generating a three-dimensional image by minimizing distortion caused by brightness or color difference between source images.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided a method of reconstructing a three-dimensional color mesh, the method including: receiving mesh information of an object, multiple multi-view images obtained by photographing the object at different positions, and camera parameter information corresponding to the multiple multi-view images; constructing a texture map with respect to the object on the basis of the received information and setting a texture patch referring to a color value of the same multi-view image; correcting a color value of a vertex included for each texture patch; and performing rendering with respect to the object by applying the corrected color value of the vertex to the texture map.

According to another aspect of the present disclosure, there is provided an apparatus for reconstructing a three-dimensional color mesh, the apparatus including: a texture map generating unit receiving mesh information of an object, multiple multi-view images obtained by photographing the object at different positions, and camera parameter information corresponding to the multiple multi-view images so as to construct a texture map with respect to the object; a texture patch generating unit generating a texture patch including faces referring to a color value of the same multi-view image; a vertex correcting unit correcting a color value of a vertex included for each texture patch; and a rendering processing unit performing rendering with respect to the object by applying the corrected color value of the vertex to the texture map.

It is to be understood that the foregoing summarized features are exemplary aspects of the following detailed description of the present disclosure without limiting the scope of the present disclosure.

According to the present disclosure, there is provided a method and apparatus for generating a three-dimensional image without a texture seam.

Also, according to the present disclosure, there is provided a method and apparatus for generating a three-dimensional image by minimizing distortion caused by brightness or color difference between source images.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly under

DETAILED DESCRIPTION OF THE INVENTION

Figure 1:
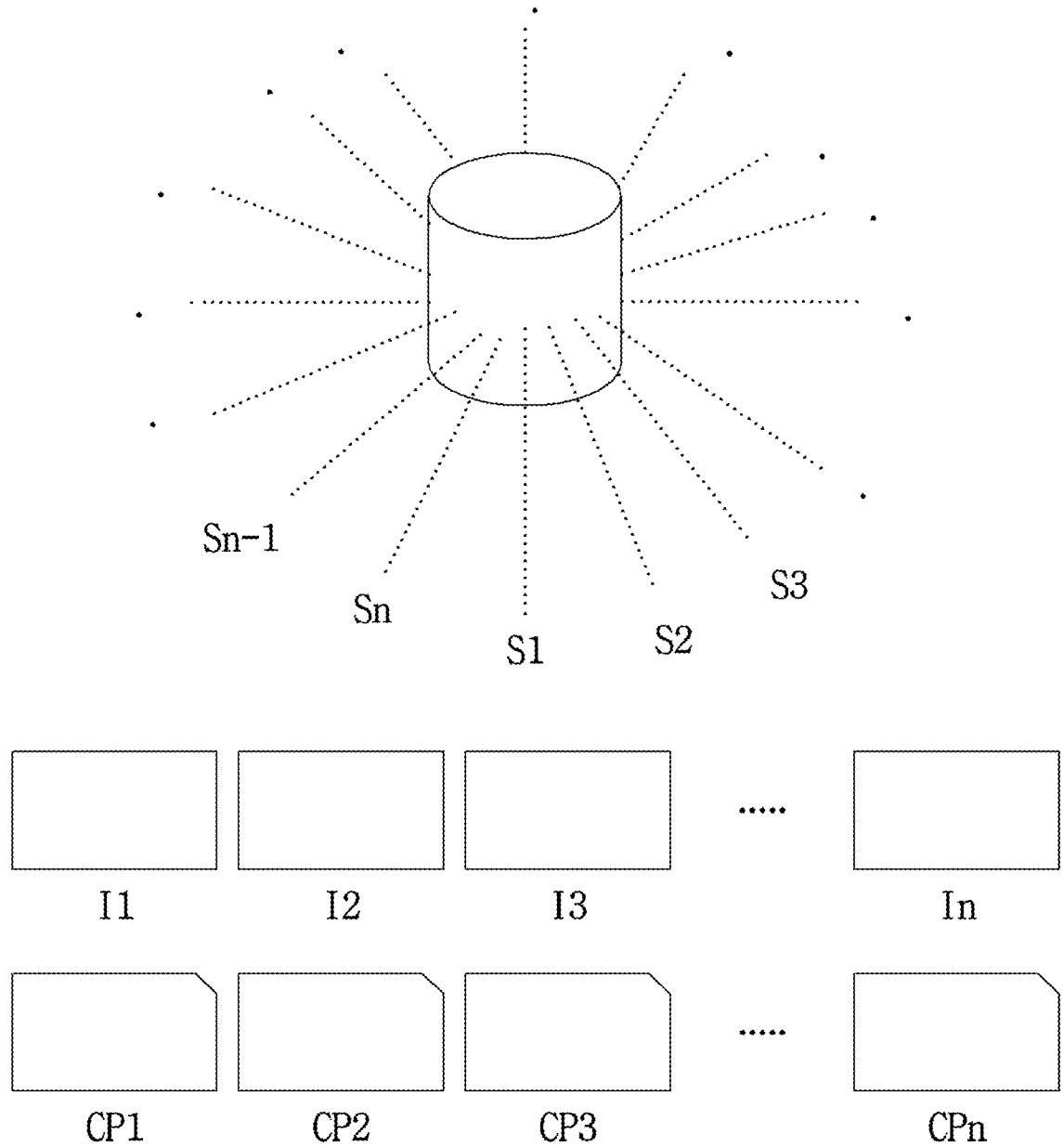
- FIG. 1 is a diagram illustrating an example of a multi-view image and camera parameter information that are used in a method of reconstructing a three-dimensional color mesh according to an embodiment of the present disclosure.

Hereinbelow, exemplary embodiments of the present disclosure will be described in detail with reference to the accompanying drawings such that the disclosure can be easily embodied by one of ordinary skill in the art to which this disclosure belongs. However, the present disclosure is not limited to the exemplary embodiments.

In describing embodiments of the present disclosure, it is noted that when the detailed description of known configurations or functions related to the present disclosure may make the gist of the present disclosure unclear, the detailed description thereof will be omitted. Also, portions that are not related to the present disclosure are omitted in the drawings, and like reference numerals designate like elements.

In the present disclosure, when an element is "coupled to", "combined with", or "connected to" another element, it can be directly coupled to the other element or intervening elements may be present therebetween. Also, when a constituent "comprises" or "includes" an element, unless specifically described, the constituent does not exclude other elements but may further include the elements.

In the present disclosure, the terms "first", "second", etc. are only used to distinguish one element from another element. Unless specifically stated otherwise, the terms do not denote an order or importance. Thus, without departing from the scope of the present disclosure, a first element of an embodiment could be termed a second element of another embodiment. Similarly, a second element of an embodiment could also be termed a first element of another embodiment.

In the present disclosure, elements that are distinguished from each other to clearly describe each feature do not necessarily denote that the elements are separated. That is, a plurality of elements may be integrated into one hardware or software unit, or one element may be distributed into a plurality of hardware or software units. Accordingly, even if not mentioned, the integrated or distributed embodiments are included in the scope of the present disclosure.

In the present disclosure, elements described in various embodiments do not denote essential elements, and some of the elements may be optional. Accordingly, an embodiment that includes a subset of elements described in another embodiment is included in the scope of the present disclosure. Also, an embodiment that includes the elements which are described in the various embodiments and additional other elements is included in the scope of the present disclosure.

Hereinafter, the embodiments of the present disclosure will be described with reference to the accompanying drawings.

FIG. 1 is a diagram illustrating an example of a multi-view image and camera parameter information that are used in a method of reconstructing a three-dimensional color mesh according to an embodiment of the present disclosure.

A technology of generating three-dimensional mesh information using multi-view images has been developed with various purposes and methods. Among the methods, a method of generating and mapping a texture to a three-dimensional mesh has a big role in improving the quality of the result by adding color information to the mesh.

In order to generate and map the texture to the three-dimensional mesh, there are required mesh information pre-generated with respect to an object 100, multiple multi-view images I1, I2, ..., and In, and respective pieces of camera parameter information CP1, CP2, ..., CPn corresponding to the multi-view images I1, I2, ..., and In. For example, the multiple multi-view images I1, I2, ..., and In may be images obtained by photographing the object at different positions S1, S2, ..., and Sn. Corresponding thereto, the camera parameter information CP1, CP2, ..., and CPn may include information on positions at which respective multi-view images I1, I2, ..., and In are obtained with respect to the object 100, e.g. an angle of photographing direction of the camera, a distance between the object and the camera, etc.

Figure 2:
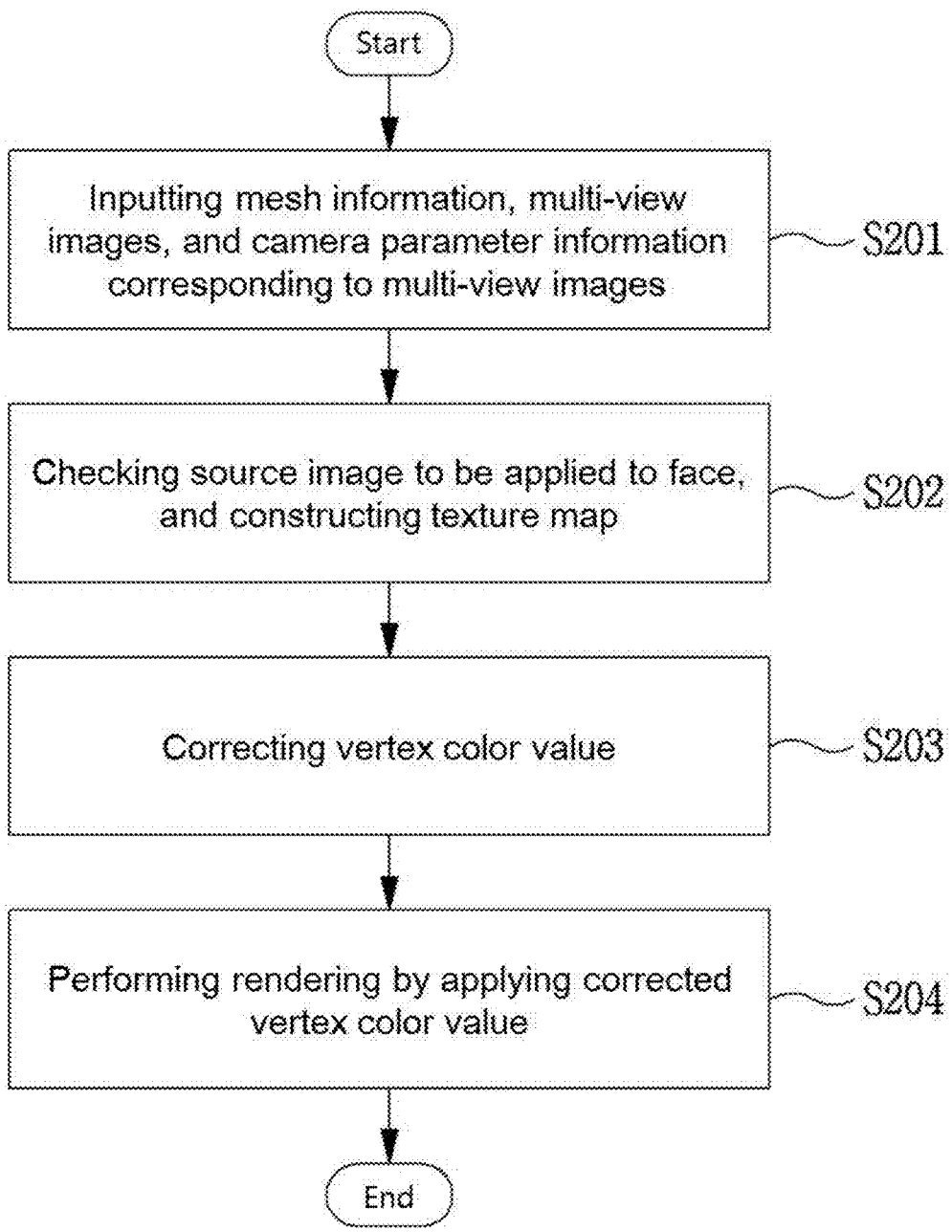
FIG. 2 is a flowchart illustrating a sequence of a method of reconstructing a three-dimensional color mesh according to an embodiment of the present disclosure.

FIG. 2 is a flowchart illustrating a sequence of a method of reconstructing a three-dimensional color mesh according to an embodiment of the present disclosure.

Referring to FIG. 2, at step S201, information required in generating and mapping the texture to the three-dimensional mesh may be received. For example, as described above, there are input the mesh information pre-generated with respect to the object, the multiple multi-view images I1, I2, ..., and In, and the camera parameter information CP1, CP2, ..., and CPn corresponding to the respective multi-view images I1, I2, ..., and In.

At step S202, a source image to be applied on a per-face basis of the mesh is identified, namely, one of the multiple multi-view images I1, I2, ..., and In is selected, and a region corresponding to each face of the mesh is set in the selected multi-view image.

Here, the source image may be set considering a normal vector of a face, the angle of the photographing direction of the camera, the distance between the face and the camera, etc. For example, an image in which the camera views the corresponding face closely from the front may be set as the source image. In this process, there is likelihood that adjacent faces set the source image using the same multi-view image. Considering this, the faces, which set the source image using the same multi-view image, are set as a single group and are set as a texture patch.

Also, at step S202, the texture map may be constructed using the source images. For example, the texture map may be constructed using a pixel shading method of a GPU. On the basis of a basic shading function of the GPU, a final rendering color value is obtained by multiplying an original texture color value by a vertex color value, and the texture map may be constructed with the obtained value.

Figure 3:
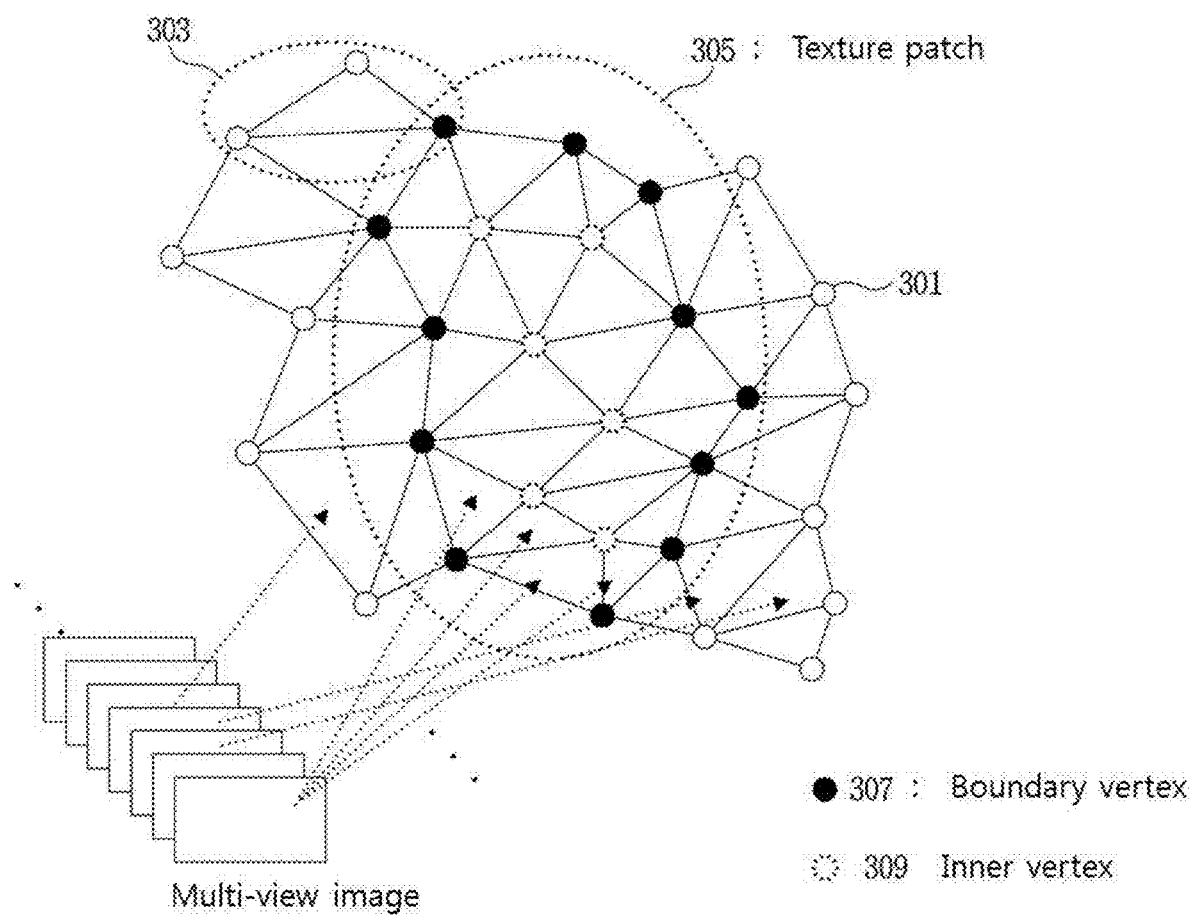
FIG. 3 is a diagram illustrating an example of a vertex, a face, and a texture patch used in a method of reconstructing a three-dimensional color mesh according to an embodiment of the present disclosure.

FIG. 3 is a diagram illustrating an example of a vertex, a face, and a texture patch used in a method of reconstructing a three-dimensional color mesh according to an embodiment of the present disclosure.

A three-dimensional mesh 300 for the object may be constructed, and the three-dimensional mesh 300 may include vertexes 301. A face 303 may be formed by connecting the vertexes 301.

In the meantime, as described at step S202, the faces, which set the source image using the same multi-view image, are set as a single group that is a texture patch 305.

Also, the texture patch 305 and another texture patch adjacent thereto may foam a boundary line therebetween. Considering this, in the embodiment of the present disclosure, a vertex on the boundary line is defined as a boundary vertex 307, and a vertex that is present inside the texture patch 305 without being on the boundary line of the texture patch 305 is defined as an inner vertex 309.

In the meantime, at step S203 in FIG. 2, the color value of the vertex included in the texture patch 305 may be corrected.

For example, at step S203, the color value of the boundary vertex 307 may be corrected. Correction of the color value of the boundary vertex 307 may be performed using color values of all the multi-view images including regions with respect to the boundary vertex 307.

Specifically, in the multiple multi-view images, the color values of respective regions with respect to the boundary vertex 307 are detected, and an average value of the detected color values may be set to a target color value of the boundary vertex 307. In order to change a current color value of the boundary vertex 307 into the target color value, the current color value of the boundary vertex 307 is multiplied by a correction value such that the color value of the boundary vertex 307 is corrected.

The current color value of the boundary vertex 307, the target color value of the boundary vertex 307, and the correction value of the boundary vertex 307 may be expressed in the following Equation 1. Accordingly, the correction value of the boundary vertex 307 may be obtained by dividing the target color value of the boundary vertex 307 by the current color value of the boundary vertex 307.

Target color value of boundary vertex=current color value of boundary vertex×correction value of boundary vertex    [Equation 1]

Further, at step S203, a color value of the inner vertex 309 may be corrected. Correction of the color value of the inner vertex 309 may be performed using the correction value of the boundary vertex 307 obtained in correcting the color value of the boundary vertex 307. For example, the correction value of the inner vertex 309 is determined by calculating the color value of the boundary vertex 307 and an average value of correction values of adjacent boundary vertexes 307, and the current color value of the inner vertex 309 is multiplied by the correction value of the inner vertex 309 such that the color value of the inner vertex 309 is corrected.

At step S204, the color values of the corrected vertexes (the boundary vertex and the inner vertex) are applied to the texture map of the mesh, thereby performing rendering.

Figure 4A:
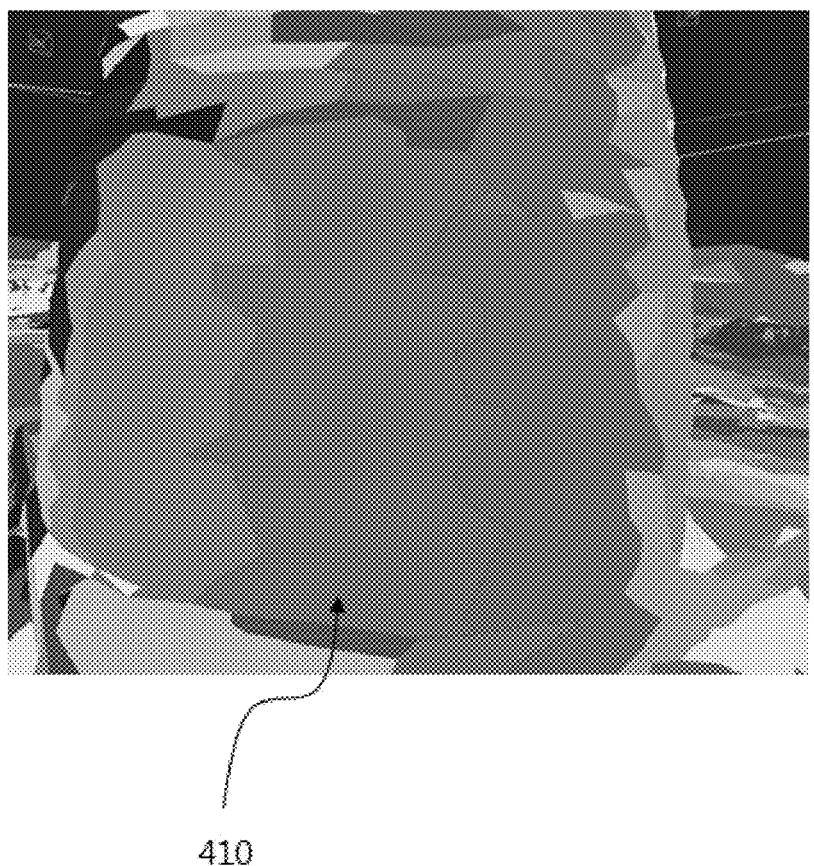
FIGS. 4A to 4C are diagrams illustrating examples of a texture patch, a result of correcting a color value of a boundary vertex, and a result of correcting a color value of an inner vertex that are generated in a method of reconstructing a three-dimensional color mesh according to an embodiment of the present disclosure.
Figure 4B:
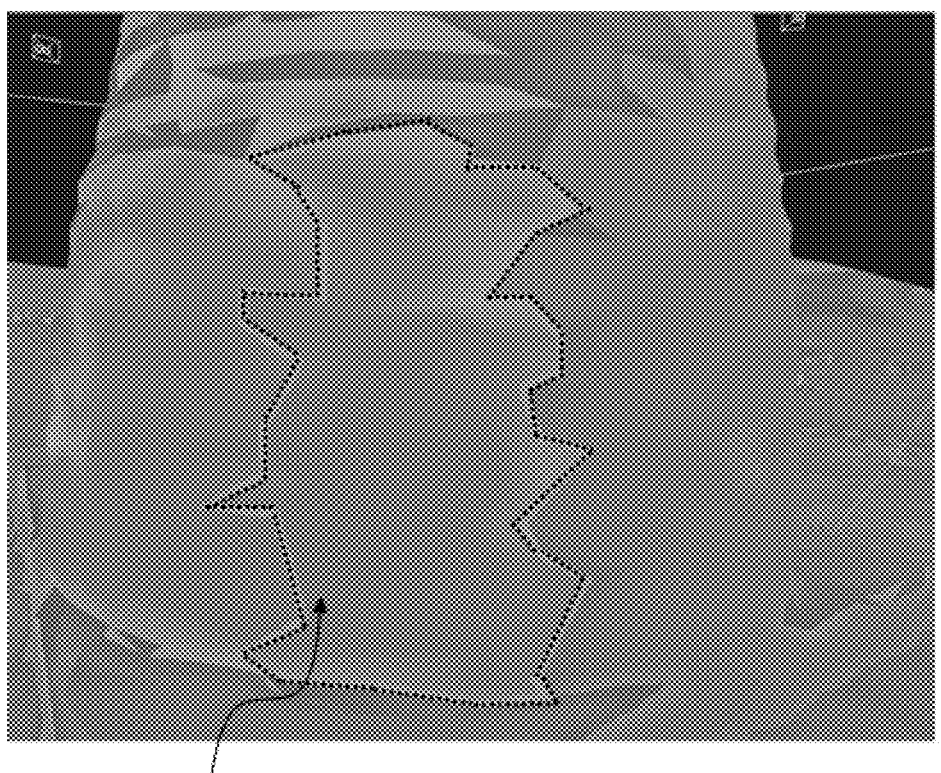
Figure 4C:
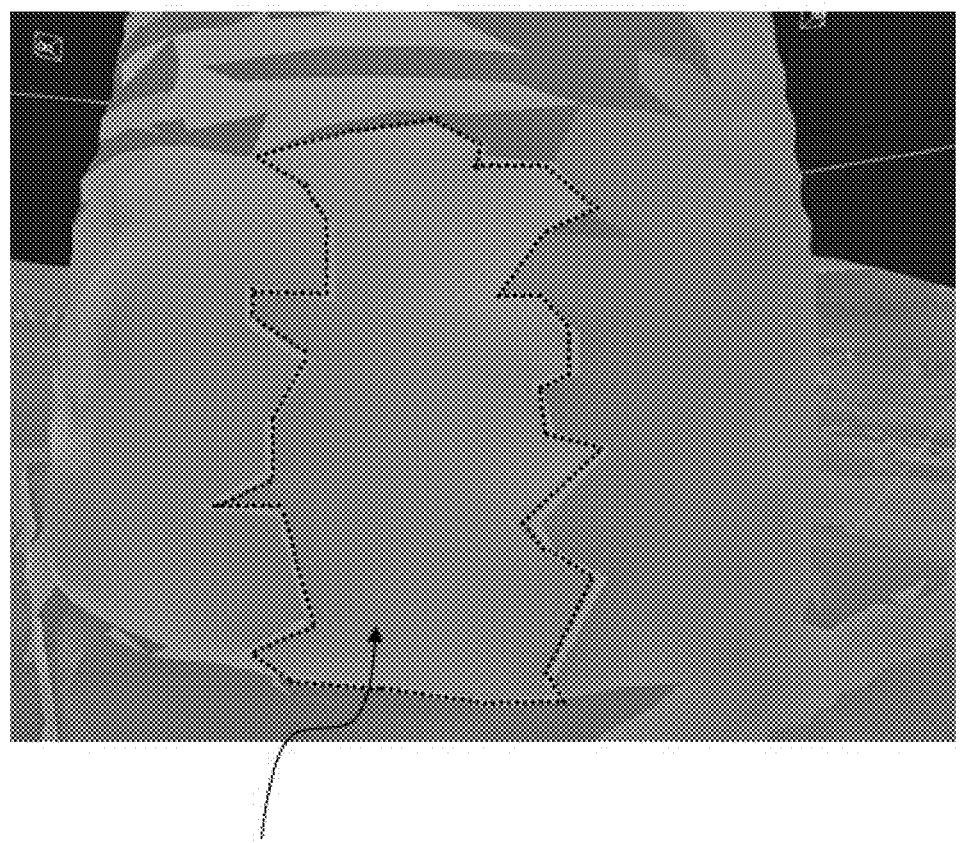

FIGS. 4A to 4C are diagrams illustrating examples of a texture patch, a result of correcting a color value of a boundary vertex, and a result of correcting a color value of an inner vertex that are generated in a method of reconstructing a three-dimensional color mesh according to an embodiment of the present disclosure. Hereinafter, operation at step S203 will be described in detail with reference to FIGS. 4A to 4C.

First, in a texture patch 410 shown in FIG. 4A, the boundary vertex which is detected is positioned at the boundary portion of the texture patch. Next, the target color value of the boundary vertex is determined.

The target color value of the boundary vertex may be set referring to a pixel color value of the multi-view image. Specifically, the texture map may be constructed using the multi-view image and the camera parameter. In the texture map, on the basis of the camera parameter, a projection image may be obtained inversely. Accordingly, on the basis of the camera parameter, the projection image visually containing the region corresponding to the boundary vertex, and the position of the pixel corresponding to the boundary vertex may be calculated. As described above, from the projection images containing boundary vertexes, pixel color values for the regions corresponding to the boundary vertexes may be extracted.

An average value of the extracted pixel color values is obtained, and the average value may be determined as the target color value of the boundary vertex. The target color value of the boundary vertex may be applied to overall boundary vertexes in the relevant texture patch. When the target color value of the boundary vertex is determined, the correction value of the boundary vertex is calculated. The correction value of the boundary vertex is obtained by dividing the target color value of the boundary vertex by the current color value of the boundary vertex.

After, the correction value of the boundary vertex is multiplied by the current color value of the boundary vertex such that the color value of the boundary vertex is corrected. FIG. 4B shows an example of the result 420 in which the color values of the boundary vertexes are corrected.

Further, at step S203, the color value of the inner vertex may be corrected.

The color value of the inner vertex may be processed with interpolation by a barycentric coordinates technique using the color value of the boundary vertex. The barycentric coordinates technique is a method of expressing an arbitrary position in two-dimensional or three-dimensional geometry using positional relations between adjacent guide vertexes. Representative techniques include mean value coordinates (MVS), harmonics coordinates, green coordinates, etc.

For example, the correction value of the inner vertex may be calculated using the correction value of the boundary vertex. That is, the correction value of the inner vertex may be determined as an average value of the correction values of adjacent boundary vertexes. As another example, the correction value of the inner vertex may be set to the same value as the correction value of the adjacent boundary vertex.

In the embodiment of the present disclosure, the method of calculating the correction value of the inner vertex is described, but the present disclosure is not limited thereto. In the present disclosure, the correction value of the inner vertex is sufficiently determined using the correction value of the boundary vertex, and the correction value of the inner vertex may be determined referring to the correction value of the boundary vertex in various methods.

The correction value of the inner vertex which is determined as described above is multiplied by the current color value of the inner vertex such that the color value of the inner vertex is corrected. FIG. 4C shows an example of the result 430 in which the color values of the inner vertexes are corrected.

Figure 5:
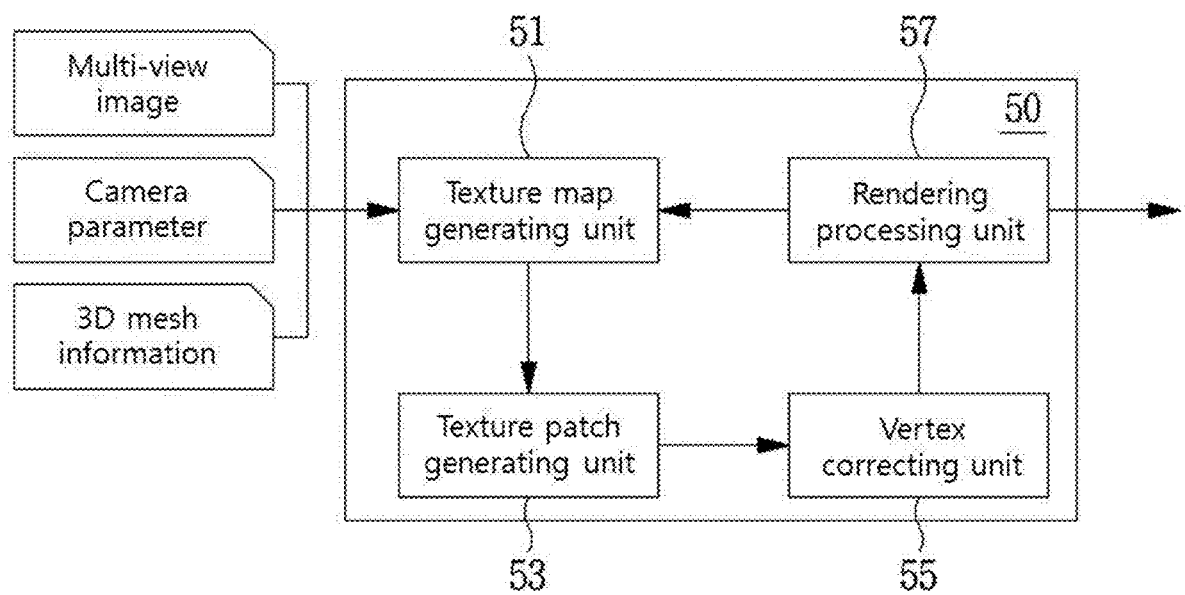
FIG. 5 is a block diagram illustrating a configuration of an apparatus for reconstructing a three-dimensional color mesh according to an embodiment of the present disclosure.
Figure 6A:
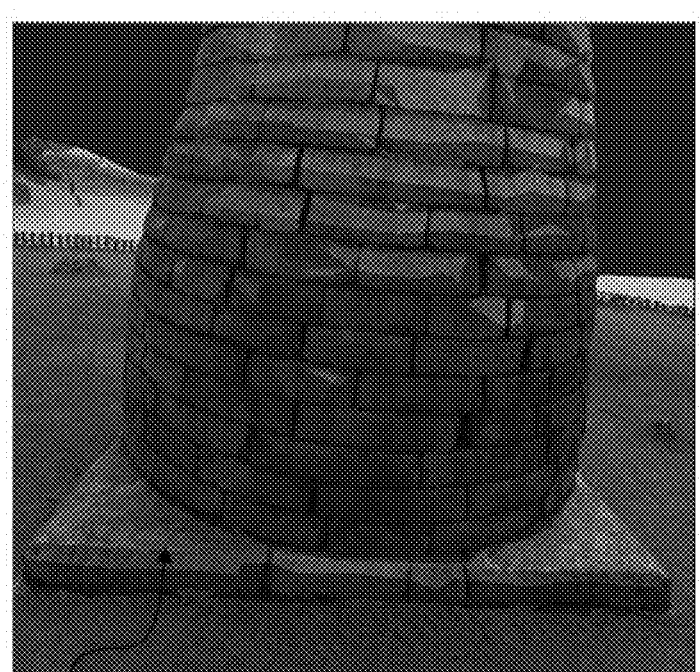
FIGS. 6A to 6E are diagrams illustrating examples of results processed in an apparatus for reconstructing a three-dimensional color mesh according to an embodiment of the present disclosure.
Figure 6B:
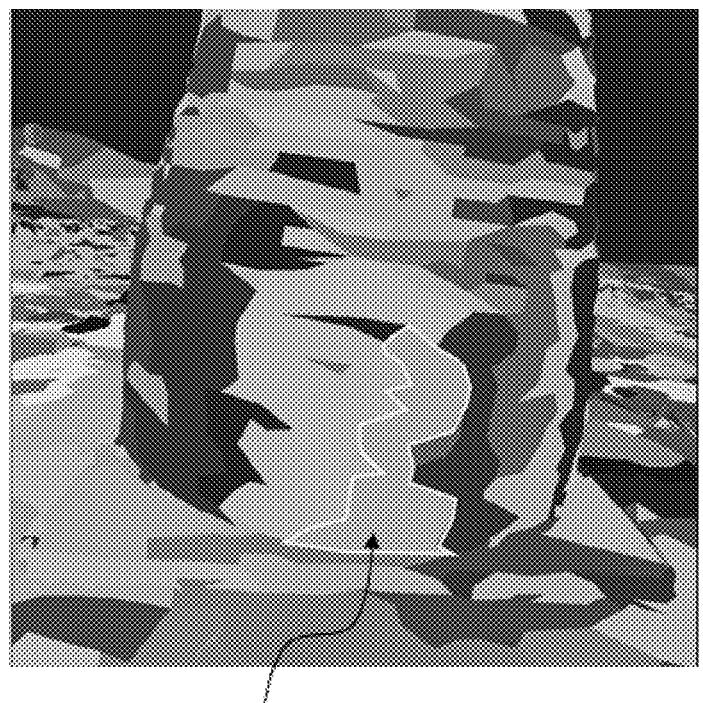
Figure 6C:
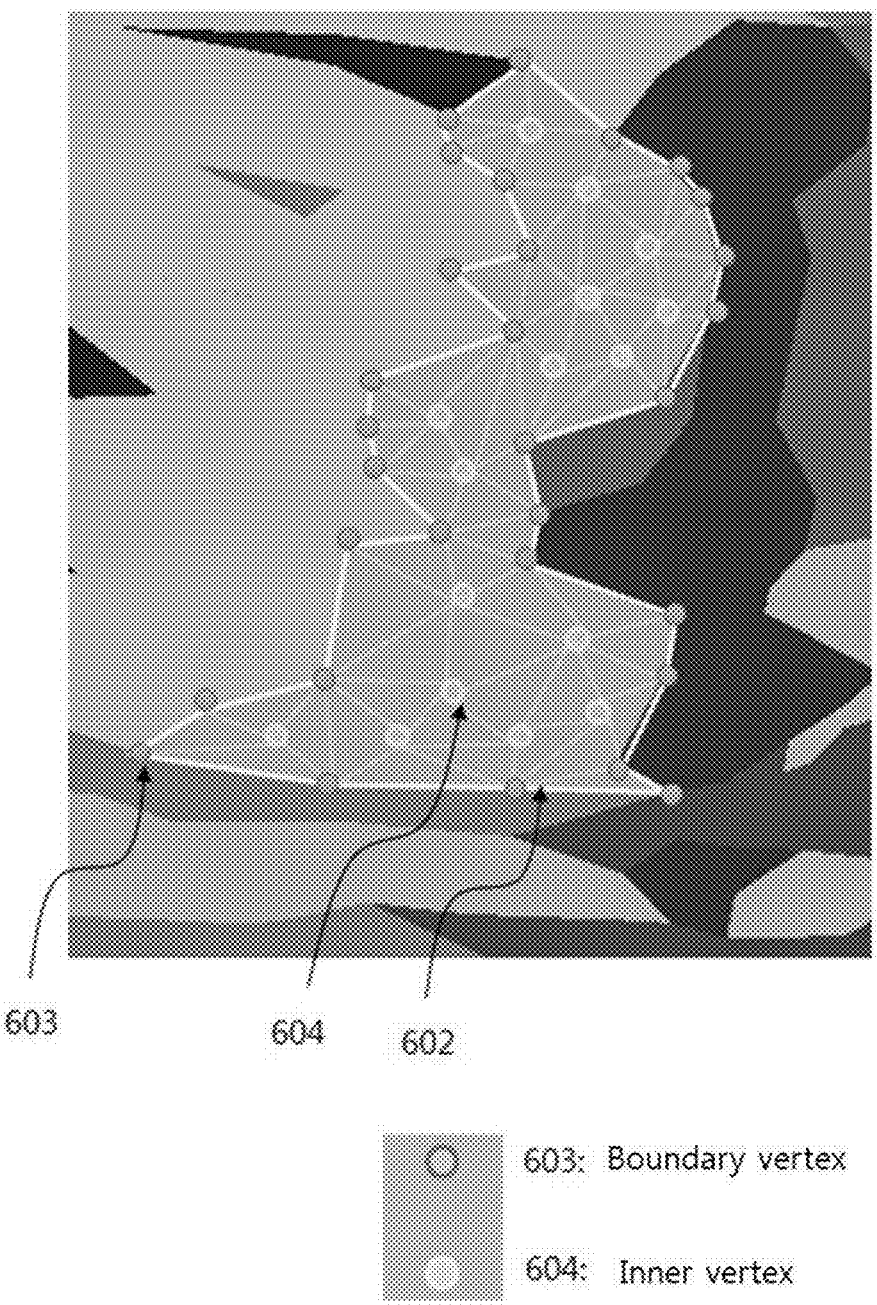
Figure 6D:
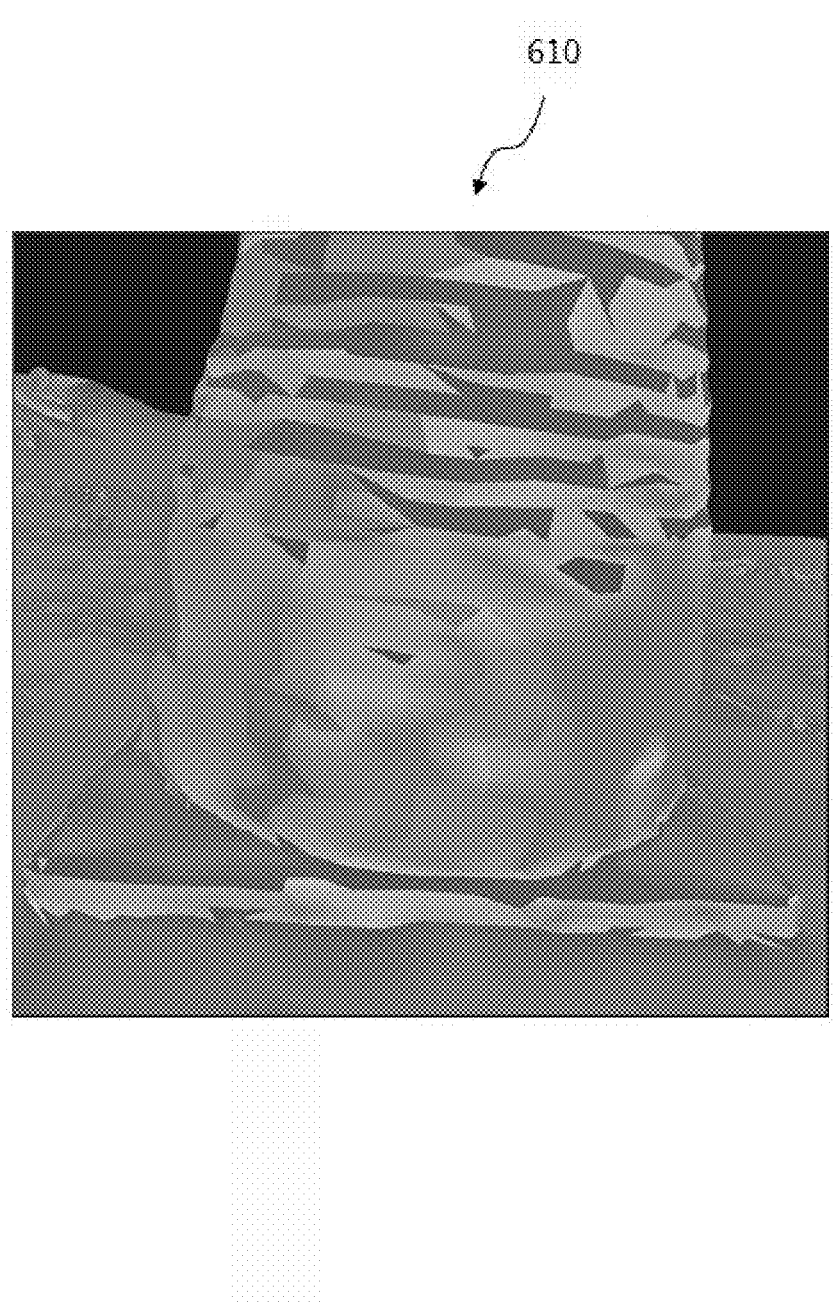
Figure 6E:
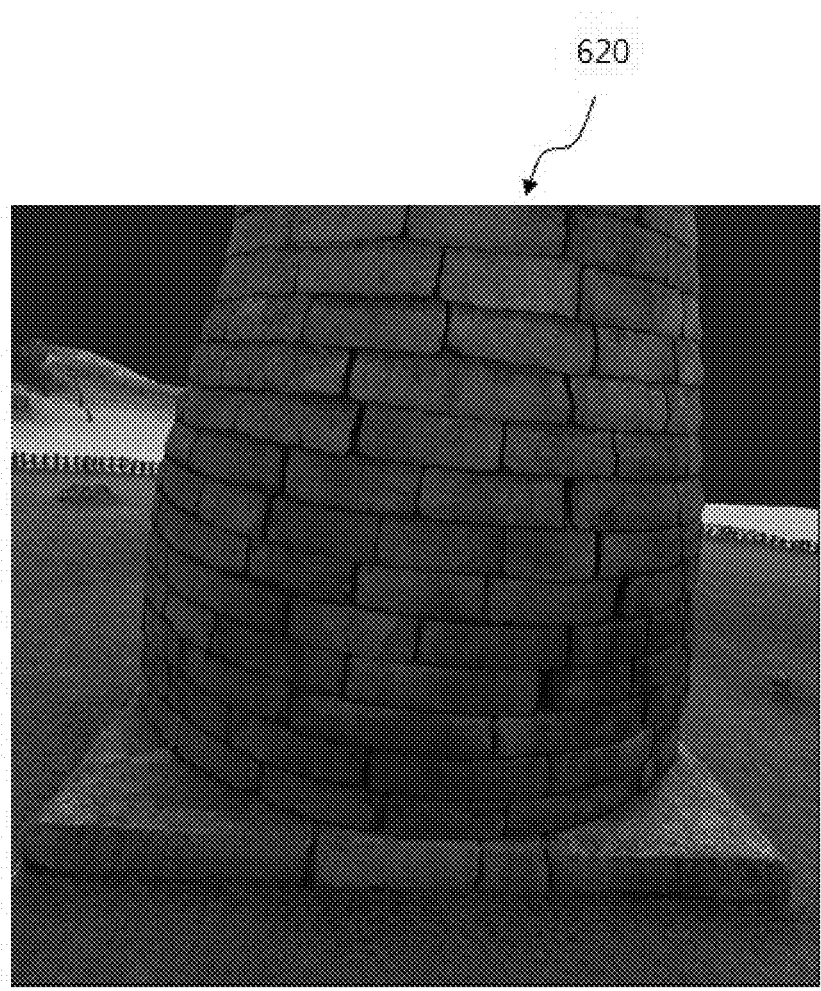

FIG. 5 is a block diagram illustrating a configuration of an apparatus for reconstructing a three-dimensional color mesh according to an embodiment of the present disclosure. FIGS. 6A to 6E are diagrams illustrating examples of results processed in an apparatus for reconstructing a three-dimensional color mesh according to an embodiment of the present disclosure Referring to FIG. 5, the apparatus 50 for reconstructing a three-dimensional color mesh may include a texture map generating unit 51, a texture patch generating unit 53, a vertex correcting unit 55, and a rendering processing unit 57.

The texture map generating unit 51 may receive information required in generating a texture map. For example, there are input the mesh information pre-determined with respect to the object, the multiple multi-view images I1, I2, . . . , and In, and the camera parameter information CP1, CP2, . . . , and CPn corresponding to the respective multi-view images I1, I2, . . . , and In.

The texture map generating unit 51 sets the source image to be applied on a per-face basis of the mesh, namely, selects one of the multiple multi-view images I1, I2, . . . , and In, and sets the region corresponding to each face of the mesh in the selected multi-view image.

The texture map generating unit 51 may construct a texture map using the source image. For example, the texture map may be constructed using the pixel shading method of the GPU. On the basis of a basic shading function of the GPU, the final rendering color value is obtained by multiplying the original texture color value and the vertex color value, and the texture map 601 (referring to FIG. 6A) is constructed with the obtained value.

The source image may be set considering the normal vector of the face, the angle of the photographing direction of the camera, the distance between the face and the camera, etc. For example, the image that the camera views the corresponding face close from the front may be set as a source image. In this process, there is likelihood that adjacent faces set the source image using the same multi-view image. Considering this, the texture patch generating unit 53 constructs the texture patch 602 (referring to FIG. 6B) by setting the faces, which set the source image using the same multi-view image, as a signal group.

In the meantime, the vertex correcting unit 55 may correct the color value of the vertex included in the texture patch 602.

The texture patch 602 and another texture patch adjacent thereto may form a boundary line therebetween. Considering this, in the embodiment of the present disclosure, a vertex on the boundary line is defined as a boundary vertex 603, and a vertex that is present inside the texture patch 602 without being on the boundary line of the texture patch 602 is defined as an inner vertex 604.

The vertex correcting unit 55 may correct the color value of the boundary vertex 603 included in the texture patch 602.

For example, the vertex correcting unit 55 may operate using color values of all the multi-view images including regions with respect to the boundary vertex 603. Specifically, the vertex correcting unit 55 may calculate the target color value of the boundary vertex by referring to the pixel color value of the multi-view image. The texture map may be constructed using the multi-view image and the camera parameter, and the projection image may be obtained inversely, on the basis of the camera parameter in the texture map. Accordingly, on the basis of the camera parameter, the vertex correcting unit 55 may calculate the position of the pixel corresponding to the boundary vertex in the projection image visually containing the region corresponding to the boundary vertex. As described above, the vertex correcting unit 55 may extract the pixel color values for the regions corresponding to the boundary vertex from the projection images containing the boundary vertexes.

Further, the vertex correcting unit 55 may calculate an average value of the extracted pixel color values, and may determine the average value as the target color value of the boundary vertex. The target color value of the boundary vertex may be applied to overall boundary vertexes in the relevant texture patch. When the target color value of the boundary vertex is determined, the vertex correcting unit 55 may calculate the correction value of the boundary vertex. The vertex correcting unit 55 obtains the correction value of the boundary vertex by dividing the target color value of the boundary vertex by the current color value of the boundary vertex.

After, the vertex correcting unit 55 may correct the color value of the boundary vertex by multiplying the correction value of the boundary vertex and the current color value of the boundary vertex.

Further, the vertex correcting unit 55 may correct the color value of the inner vertex 604. The vertex correcting unit 55 may correct the color value of the inner vertex 604 using the correction value of the boundary vertex 603 obtained in correcting the color value of the boundary vertex 603. For example, the vertex correcting unit 55 may determine the correction value of the inner vertex 604 calculating an average value of correction values of boundary vertexes 603 adjacent to the inner vertex 604, and may correct the color value of the inner vertex 604 by multiplying the correction value of the inner vertex 604 and the current color value of the inner vertex 604.

As another example, the vertex correcting unit 55 may correct the color value of the inner vertex 309 with interpolation by the barycentric coordinates technique using the color value of the boundary vertex 307. The barycentric coordinates technique is a method of expressing an arbitrary position in two-dimensional or three-dimensional geometry using positional relations between adjacent guide vertexes. Representative techniques include mean value coordinates (MVS), harmonics coordinates, green coordinates, etc.

As another example, the vertex correcting unit 55 may set the correction value of the inner vertex to the same value as the correction value of the adjacent boundary vertex.

In the embodiment of the present disclosure, the method of calculating the correction value of the inner vertex by the vertex correcting unit 55 is described, but the present disclosure is not limited thereto. In the present disclosure, the vertex correcting unit 55 sufficiently calculates the correction value of the inner vertex using the correction value of the boundary vertex, and determines the correction value of the inner vertex referring to the correction value of the boundary vertex in various methods.

Through the operation, the vertex correcting unit 55 may output the result 610 (referring to FIG. 6D) in which the color values of the vertexes included in the texture patch 305 are corrected.

The rendering processing unit 57 may perform rendering by applying the corrected color values of the vertexes (e.g., the boundary vertex and the inner vertex) to the texture map of the mesh. Consequently, the rendering processing unit 57 may output the result 620 (referring to FIG. 6E) of rendering to which the corrected color values of the vertexes (e.g., the boundary vertex and the inner vertex) are applied.

According to the present disclosure, when reconstructing the three-dimensional color mesh, a smooth and natural texture map is generated using the multi-view images. The error caused by brightness or color difference between input images is corrected and a texture map with smooth continuity is automatically generated without a seam. Accordingly, by using only the multi-view images of the actual object, terrain features, etc., automatic reconstruction in a three-dimensional color mesh is possible.

Also, in computing the correction color value of the boundary vertex at which a texture seam occurs, more consistent texture color correction may be achieved by referring to color tones of the entire input images overall. For example, when it is necessary to generate a large amount of texture by being divided into small pieces due to the problem with system resources, conventional techniques only consider regional processing and thus continuity between divided textures may not be ensured. However, in the present disclosure, the target correction color value is set on the basis of color tones of the entire input images such that continuity is ensured even when dividing a large amount of data and performing texturing.

Also, through vertex color value interpolation inside the texture path, continuity of texture colors may be ensured. Since the faces constitute the texture patch have the same source image, the faces may be projected on the relevant two-dimensional source image in the shape of 2D polygon. On the basis thereof, a vertex color is corrected with interpolation to be smooth such that distortion of the source image is minimized.

Figure 7:
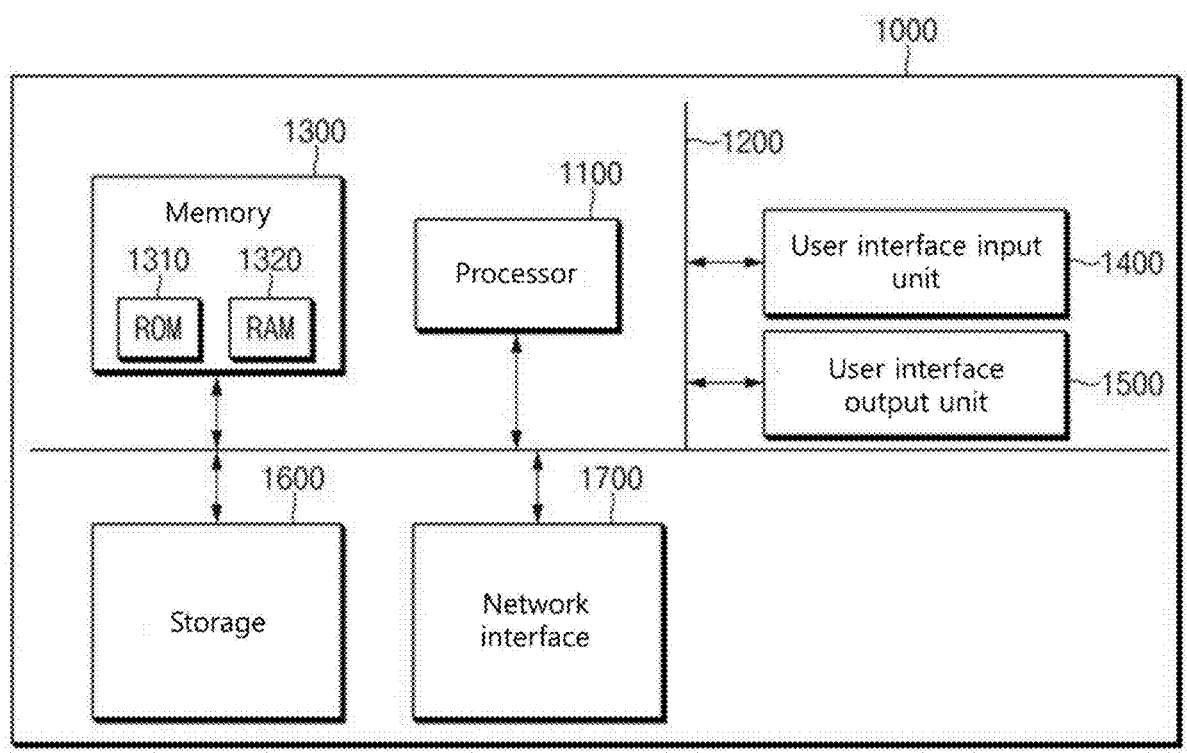
FIG. 7 is a block diagram illustrating an example of a computing system executing a method of reconstructing a three-dimensional color mesh and an apparatus for the same according to an embodiment of the present disclosure.

FIG. 7 is a block diagram illustrating an example of a computing system executing a method of reconstructing a three-dimensional color mesh and an apparatus for the same according to an embodiment of the present disclosure.

Referring to FIG. 7, a computing system 1000 may include at least one processor 1100, a memory 1300, a user interface input unit 1400, a user interface output unit 1500, a storage 1600, and a network interface 1700 that are connected to each other via a bus 1200.

The processor 1100 may be a central processing unit (CPU) or a semiconductor unit executing processes for instructions stored in the memory 1300 or the storage 1600 or both. The memory 1300 and the storage 1600 may include various types of volatile or non-volatile storage mediums. For example, the memory 1300 may include a read only memory (ROM) and a random access memory (RAM).

Accordingly, the steps of the method or the algorithm described with respect to the embodiments may be implemented directly by a hardware module or a software module or a combination thereof, which are executed by the processor 1100. The software module may be provided in a storage medium (i.e., the memory 1300 or the storage 1600 or both) such as a RAM, a flash memory, a ROM, an EPROM, an EEPROM, a resistor, a hard disc, a detachable disc, a CD-ROM. For example, the storage medium may be coupled to the processor 1100, and the processor 1100 may read information from the storage medium and may write information on the storage medium. As another example, the storage medium may be provided with the processor 1100 in an integrated manner. The processor and the storage medium may be provided in an application-specific integrated circuit (ASIC). The ASIC may be provided in a user terminal. As another example, the processor and the storage medium may be provided in the user terminal as individual components.

Although exemplary methods of the present disclosure are represented as a series of operations for clarity of description, the order of the steps is not limited thereto. When necessary, the illustrated steps may be performed simultaneously or in a different order. In order to implement the methods according to the present disclosure, the illustrative steps may further include other steps, or some steps are excluded and the remaining steps are included, or some steps are excluded and additional other steps are included.

The various embodiment of the present disclosure do not list all possible combinations, and are intended to be illustrative the representative aspects of the present disclosure. The matters described in the various embodiments may be independently applied or in a combination of two or more.

Also, the various embodiments of the present disclosure may be implemented by hardware, firmware, software, or a combination thereof. With hardware implementation, the embodiment may be implemented by using at least one selected from a group of application specific integrated circuits (ASICs), digital signal processors (DSPs), digital signal processing devices (DSPDs), programmable logic devices (PLDs), field programmable gate arrays (FPGAs), general-purpose processors, controllers, micro controllers, micro processors, etc.

The scope of the present disclosure includes software or machine-executable instructions (e.g., an operating system, an application, firmware, a program, etc.) that cause operation according to the methods of the various embodiments to be performed on a device or a computer, and includes a non-transitory computer-readable medium storing such software or instructions to execute on a device or a computer.

What is claimed is:

1. A method of reconstructing a three-dimensional color mesh, the method comprising:
   receiving mesh information of an object, multiple multi-view images obtained by photographing the object at different positions, and camera parameter information corresponding to the multiple multi-view images;
   constructing a texture map with respect to the object on the basis of the received information and setting a texture patch referring to a color value of the same multi-view image;
   correcting a color value of a vertex included for each texture patch; and
   performing rendering with respect to the object by applying the corrected color value of the vertex to the texture map.

2. The method of claim 1, wherein the correcting of the color value of the vertex comprises:
   extracting a boundary vertex included for each texture patch;
   calculating a color correction value of the boundary vertex; and
   correcting a current color value of the boundary vertex by multiplying the color correction value of the boundary vertex and the current color value of the boundary vertex.

3. The method of claim 2, wherein the calculating of the color correction value of the boundary vertex comprises:
   calculating a target color value of the boundary vertex; and
   calculating the color correction value of the boundary vertex by dividing the target color value of the boundary vertex by the current color value of the boundary vertex.

4. The method of claim 3, wherein the calculating of the color correction value of the boundary vertex comprises:
- detecting at least one of the multiple multi-view images, which includes a region corresponding to the boundary vertex;
- checking a pixel value of the region corresponding to the boundary vertex from the at least one multi-view image; and
- calculating the target color value of the boundary vertex with reference to the checked pixel value of the region corresponding to the boundary vertex.

5. The method of claim 3, wherein the calculating of the color correction value of the boundary vertex comprises:
- detecting at least one of the multiple multi-view images, which includes regions corresponding to the boundary vertexes;
- checking pixel values of the regions corresponding to the boundary vertexes from the at least one multi-view image; and
- calculating an average value of the checked pixel values of the regions corresponding to the boundary vertexes and calculating the color correction value of the boundary vertex using the calculated average value.

6. The method of claim 2, wherein the correcting of the color value of the vertex comprises:
- extracting an inner vertex included for each texture patch;
- calculating a color correction value of the inner vertex; and
- correcting a current color value of the inner vertex by multiplying the color correction value of the inner vertex and the current color value of the inner vertex.

7. The method of claim 6, wherein the calculating of the color correction value of the inner vertex comprises:
- checking the color correction value of the boundary vertex included for each texture patch; and
- calculating the color correction value of the inner vertex with reference to the color correction value of the boundary vertex.

8. The method of claim 7, wherein at the calculating of the color correction value of the inner vertex, an average value of the color correction values of the boundary vertexes included for each texture patch is calculated, and the calculated average value is determined as the color correction value of the inner vertex.

9. The method of claim 7, wherein at the calculating of the color correction value of the inner vertex, the color correction value of the inner vertex is determined to be equal to the color correction value of the boundary vertex included for each texture patch.

10. An apparatus for reconstructing a three-dimensional color mesh, the apparatus comprising:
- a processor configured to:
  - receive mesh information of an object, multiple multi-view images obtained by photographing the object at different positions, and camera parameter information corresponding to the multiple multi-view images so as to construct a texture map with respect to the object;
  - generate a texture patch including faces referring to a color value of the same multi-view image;
  - correct a color value of a vertex included for each texture patch; and
  - perform rendering with respect to the object by applying the corrected color value of the vertex to the texture map.

11. The apparatus of claim 10, wherein the processor is configured to,
- extract a boundary vertex included for each texture patch;
- calculate a color correction value of the boundary vertex; and
- correct a color value of the boundary vertex by multiplying the color correction value of the boundary vertex and the current color value of the boundary vertex.

12. The apparatus of claim 11, wherein the processor is configured to,
- calculate a target color value of the boundary vertex; and
- calculate the color correction value of the boundary vertex by dividing the target color value of the boundary vertex by the current color value of the boundary vertex.

13. The apparatus of claim 11, wherein the processor is configured to,
- extract an inner vertex included for each texture patch;
- calculate a color correction value of the inner vertex; and
- correct a current color value of the inner vertex by multiplying the color correction value of the inner vertex and the current color value of the inner vertex.

14. The apparatus of claim 13, wherein the processor is configured to,
- check the color correction value of the boundary vertex included for each texture patch, and
- calculate the color correction value of the inner vertex with reference to the color correction value of the boundary vertex.

* * * * *